US005423178A

United States Patent [19]

Mains

[11] Patent Number: 5,423,178

[45] Date of Patent: Jun. 13, 1995

[54] MULTIPLE PASSAGE COOLING CIRCUIT METHOD AND DEVICE FOR GAS TURBINE ENGINE FUEL NOZZLE

[75] Inventor: Robert T. Mains, Euclid, Ohio

[73] Assignee: Parker-Hannifin Corporation, Cleveland, Ohio

[21] Appl. No.: 951,599

[22] Filed: Sep. 28, 1992

[51] Int. Cl.⁶ .................. F02C 7/22

[52] U.S. Cl. .................. 60/39.06; 60/740; 60/746; 239/132.5

[58] Field of Search .................. 60/730, 733, 740, 742, 60/746, 747, 39.06; 239/132.1, 132.3, 132.5

[56] References Cited

U.S. PATENT DOCUMENTS

| | | | |
|---|---|---|---|
| 3,638,865 | 2/1972 | McEneny | 60/742 |
| 3,841,565 | 10/1974 | Buisson et asl. . | |
| 4,157,012 | 6/1979 | Dubell | 60/742 |
| 4,229,944 | 10/1980 | Weiler | 60/740 |
| 4,258,544 | 3/1981 | Gebhart et al. | 60/742 |
| 4,305,255 | 12/1981 | Davies | 60/746 |
| 4,499,735 | 2/1985 | Moore et al. | 60/746 |
| 4,735,044 | 4/1988 | Rickey et al. . | |

FOREIGN PATENT DOCUMENTS

| | | |
|---|---|---|
| 1380744 | of 1964 | France . |
| 819042 | 8/1959 | United Kingdom . |

OTHER PUBLICATIONS

International Search Report from WIPO completed Jan. 7, 1994.

*Primary Examiner*—Richard A. Bertsch
*Assistant Examiner*—W. J. Wicker
*Attorney, Agent, or Firm*—Christopher H. Morgan

[57] ABSTRACT

A gas turbine fuel nozzle and method of fuel flow provide resistance to coking of the fuel by means of a multiple passage heat transfer cooling circuit. Fuel streams to primary and secondary sprays of pilot and main nozzle tips are arranged to transfer heat between the pilot primary fuel stream and each of the main secondary fuel stream and the pilot secondary fuel stream. This protects the fuel in the streams from coking during both low flow, lower engine heat conditions and high flow, high engine heat conditions. This nozzle and flow can protect engines with both single tip and dual tip nozzles.

36 Claims, 7 Drawing Sheets

MULTIPLE PASSAGE COOLING CIRCUIT METHOD AND DEVICE FOR GAS TURBINE ENGINE FUEL NOZZLE

BACKGROUND OF THE INVENTION

1. Field of the Invention

This invention relates in general to methods and devices for dispensing fuel in gas turbine engines. More particularly, but without limitation thereto, this invention relates to gas turbine fuel nozzles and methods for maintaining the fuel which is conveyed therethrough below the temperature which would cause overheating or coking of the fuel.

2. Description of the Prior Art

Gas turbine fuel nozzles which disperse fuel into the combustion area of turbine engines such as airplane engines are well known. Generally these nozzles are attached to an inner wall of the engine housing and are spaced apart around the periphery of the engine to dispense fuel in a generally cylindrical pattern. For example, 30 nozzles could be spaced about the fuel-dispersing zones of a turbine engine. These turbine engines can be arranged with single annular or dual annular fuel dispensing zones. For the engines with dual annular fuel dispensing zones, the nozzles can have two tips on each nozzle body to allow the nozzle to spray or atomize fuel into each of the annular fuel dispensing zones. Thus, an engine with 30 dual-tip nozzles would have 60 nozzle tips. Valves can regulate flow of fuel to each of the tips. This can vary the flow of fuel to the dual annular fuel dispensing zones.

A particular problem with gas turbine fuel nozzles is that the nozzles must be located in a hot area of the engine. This heat can cause the fuel passing through the nozzle to rise in temperature sufficiently that the fuel can carbonize or coke. Such coking can clog the nozzle and prevent the nozzle from spraying properly. This is especially a problem in nozzle or engine designs which provide for fuel flow variations. In these engine or nozzle designs, the fuel flow through some nozzles is reduced to a low flow condition or a no flow condition in order to more efficiently operate the engine at a lower power. Flow through the other nozzles is maintained at a higher flow during this low or no flow use of some of the nozzles. In dual annular combustors, nozzle tips to which fuel flow starts immediately for starting and other low power operations are often referred to as pilot nozzle tips and nozzle tips to which fuel flows at relatively higher rates at high power conditions are often referred to as main nozzle tips.

In nozzles or nozzle tips with low or no flow conditions, the stagnant fuel can become heated to the point where coking will occur despite the fact that the low or no flow condition does not heat the engine as much as the high flow condition. This is because the stagnant fuel has a sufficiently long residence time in the hot nozzle environment that even the lower heat condition is sufficiently high to coke the fuel.

In nozzles or nozzle tips with high flow, the engine design can be such that the high flow condition produces a very high heat condition around the nozzle. In this situation the fuel flowing in the high flow condition may coke despite its high flow rate because of the very high heat condition produced in the engine surrounding the nozzle. This is especially true near the tip of the nozzle in nozzles with two or more tips.

One method which has been used to insulate the nozzle and reduce the tendency to coking is to intentionally provide a stagnant fuel insulation zone surrounding the fuel conduit. The stagnant fuel cokes in this insulation zone and this coke then has excellent insulation characteristics to provide insulation to the fuel conduit. However, when there is little or no flow in a nozzle passage or tip, this method offers little or no protection from coking in the fuel passage. The residence time of fuel in the low or no flow condition can be such that all possible insulation techniques are ineffective.

SUMMARY OF THE INVENTION

It is accordingly an object of the present invention to provide a gas turbine fuel nozzle which is more resistant to fuel coking in the fuel conduits of the nozzle. It is also an object of the present invention to provide such a nozzle which can operate at high and low fuel flow conditions while providing better insulation or cooling for the fuel in the high and low flow condition. It is still further an object of the present invention to provide an improved method of operating a gas turbine engine.

In accordance with these objects, the present invention provides a gas turbine fuel nozzle which includes a nozzle housing and two spray tips. A main nozzle spray tip is connected to the housing and has a main primary spray orifice through which fuel can be dispersed for combustion and a main secondary spray orifice through which fuel can be dispersed for combustion. A pilot nozzle spray tip is connected to the housing and has a primary spray orifice through which fuel can be dispersed for combustion and a pilot secondary spray orifice through which fuel can be dispersed for combustion. A main primary fuel conduit is disposed in the housing and is connected to convey fuel to the main primary spray orifice. A main secondary fuel conduit is disposed in the housing and connected to convey fuel to the main secondary spray orifice. A pilot primary fuel conduit is disposed in the housing and connected to convey fuel to the pilot primary spray orifice. A pilot secondary fuel conduit is disposed in the housing and connected to convey fuel to the pilot secondary spray orifice. The pilot primary fuel conduit extends along and is intimately connected in a heat transfer relationship with the main secondary fuel conduit and the pilot secondary fuel conduit. In this way, the coking is prevented in the nozzle fuel circuits that are staged during engine operations or in nozzle fuel circuits where fuel flow is not adequate to otherwise prevent coking. In some fuel flow conditions, cooling is provided to the main fuel zone and in other fuel flow conditions, cooling is provided to the pilot zone fuel.

Preferably, the pilot primary fuel conduit comprises a main tube section and a pilot tube section wherein the main tube section has a webbed main inner tube with a plurality of longitudinal webs extending radially outwardly therefrom. The main outer tube mates with the webs of the main inner tube to form interstitial spaces between the webs through which fuel can flow to and from the main nozzle spray tip. Also preferably, the pilot tube primary fuel conduit comprises a similar construction webbed inner tube.

Also preferably, the main primary fuel conduit comprises a main primary fuel tube disposed in the main inner tube through which fuel can be conveyed to the main primary spray orifice and wherein the main secondary conduit comprises the main inner tube. The main primary fuel tube has a main secondary annulus therebetween through which fuel can be conveyed to the main secondary spray orifice.

Although the present invention can be formed in a single, dual tip nozzle, the same concepts can apply to separate nozzles in a nozzle cooling circuit. In such a nozzle cooling circuit, a first through fourth fuel conduit are disposed in a gas turbine engine and connected to convey fuel to be sprayed for combustion in the engine. The third fuel conduit extends along and is intimately connected in a heat transfer relationship with the second fuel conduit and the fourth fuel conduit. Preferably, the heat transfer relationship is achieved by means of webbed inner tubes and outer tubes which mate with the webbed inner tubes to form longitudinal interstitial spaces therebetween.

The present invention also includes a method of dispensing fuel in a gas turbine engine of the type having pilot nozzle tips from which fuel is sprayed in primary and secondary sprays into a pilot zone of the combustor and main nozzle tips from which fuel is sprayed in primary and secondary sprays into the main zone of the combustor. The method comprises conveying fuel to the main primary spray of the main nozzle tip in a main primary fuel stream, conveying fuel to the secondary spray of the main nozzle tip in a main secondary fuel stream, conveying fuel to the primary spray of the pilot nozzle tip in a pilot primary fuel stream, and conveying fuel to the secondary spray of the pilot nozzle tip in a pilot secondary fuel stream. Heat is transferred between fuel in the pilot primary fuel stream and fuel in the main secondary fuel stream. Heat is also transferred between fuel in the pilot secondary fuel stream and fuel in the pilot primary fuel stream.

Although the present invention functions especially well with primary and secondary fuel streams in both pilot and main zones of dual zone gas turbine engines, the concept of the present invention can also be applied in single zone applications. In such an application, a first fuel spray nozzle is disposed to spray fuel for combustion in the gas turbine engine. A second fuel spray nozzle is disposed to spray fuel for combustion in the gas turbine engine. A first fuel conduit extends within the first fuel spray nozzle to convey fuel to be sprayed therefrom. A second fuel conduit has a second portion of which extending in the second fuel spray nozzle to convey fuel to be sprayed therefrom and a first portion which extends along and is intimately connected in a heat transfer relationship with the first fuel conduit. In this manner, cooling is provided between the separate nozzles during staged engine operations or when fuel flow is not otherwise adequate to prevent coking. For a further understanding of the invention and further objects, features and advantages thereof, reference may now be had to the following description taken in conjunction with the accompanying drawings.

DESCRIPTION OF PREFERRED EMBODIMENTS

Figures 1, 1A:
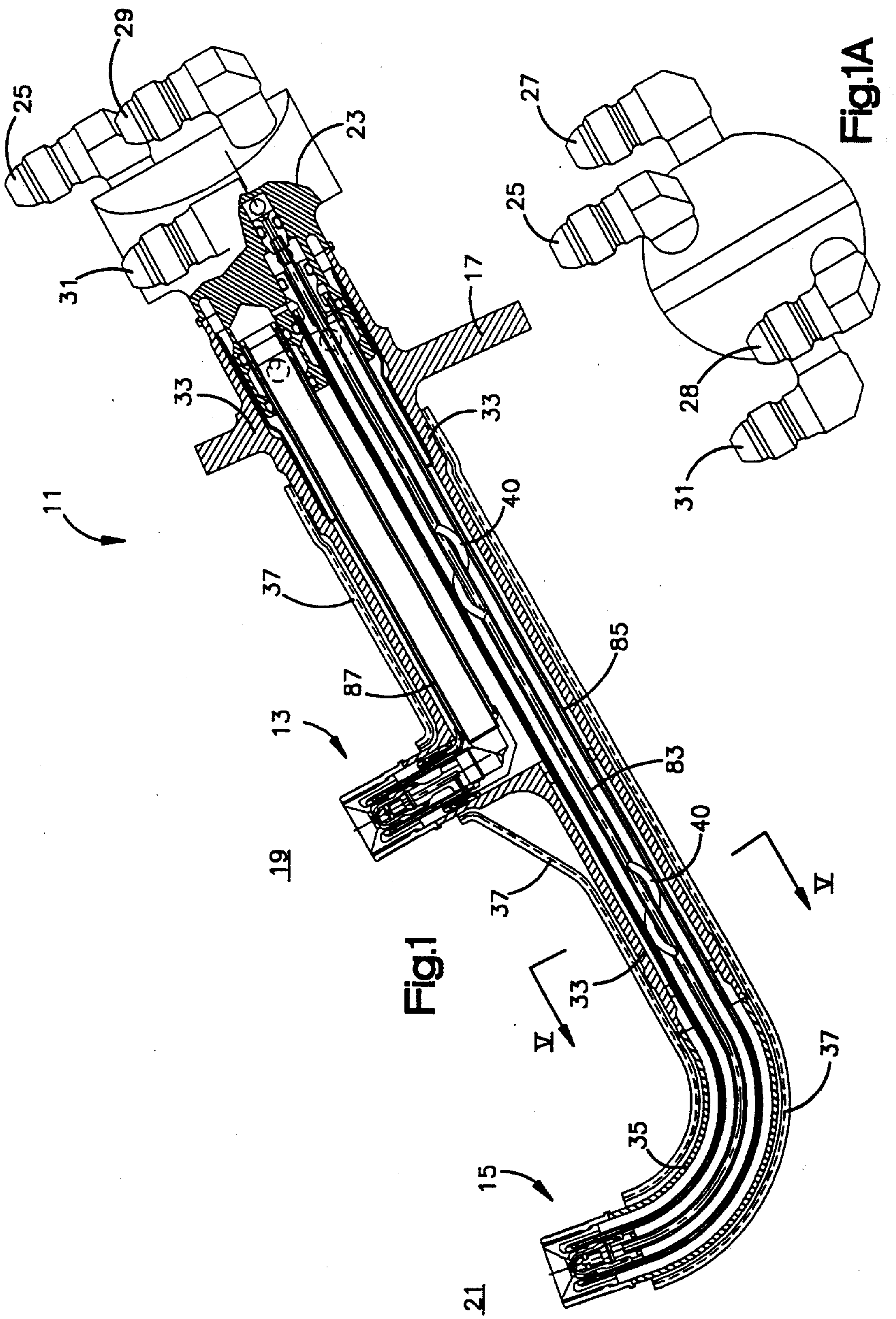
FIG. 1 is a partial cross-sectional view taken longitudinally of a nozzle constructed in accordance with the present invention.
FIG. 1A is an end view of the nozzle shown in FIG. 1.

Referring now to FIGS. 1 through 8, a nozzle constructed in accordance with the present invention is shown at 11. The nozzle 11 is a two-tip nozzle having a pilot tip 13 and a main tip 15. The nozzle 11 can be fixed to the wall of a turbine engine by a mounting bracket 17. In this manner, the pilot tip 13 is fixed to spray fuel into the annular pilot fuel dispensing zone 19 while the main tip 15 is directed to spray fuel into an annular main fuel dispensing zone 21. The annular fuel dispensing zones 19 and 21 are part of a gas turbine engine (not shown) of a type conventionally used on large jet aircraft. Generally the annular pilot fuel dispensing zone 19 is radially outside of the annular main fuel dispensing zone 21.

As shown in FIGS. 1 and 1A, the nozzle 11 has a housing 23 to which fuel conduits can be connected to convey fuel to the nozzle 11. The inlet housing 23 has four connections to allow fuel for primary and secondary sprays to be delivered to both the pilot tip 13 and the main tip 15. Connection 25 conveys fuel to the primary spray of the pilot tip 13 while connection 27 conveys fuel to the secondary spray of the pilot tip 13. Connection 29 conveys fuel to the primary spray of the main tip 15 while connection 31 conveys fuel to the secondary spray of main tip 15.

The housing 23 is connected to a housing mid-section 33, a portion of which forms mounting bracket 17. The housing mid-section 33 is, in turn, connected to a housing extension 35. A heat shield 37 extends about the housing mid-section and housing extension from adjacent the mounting bracket 17 to adjacent the pilot tip 13 and the main tip 15.

Figure 3:
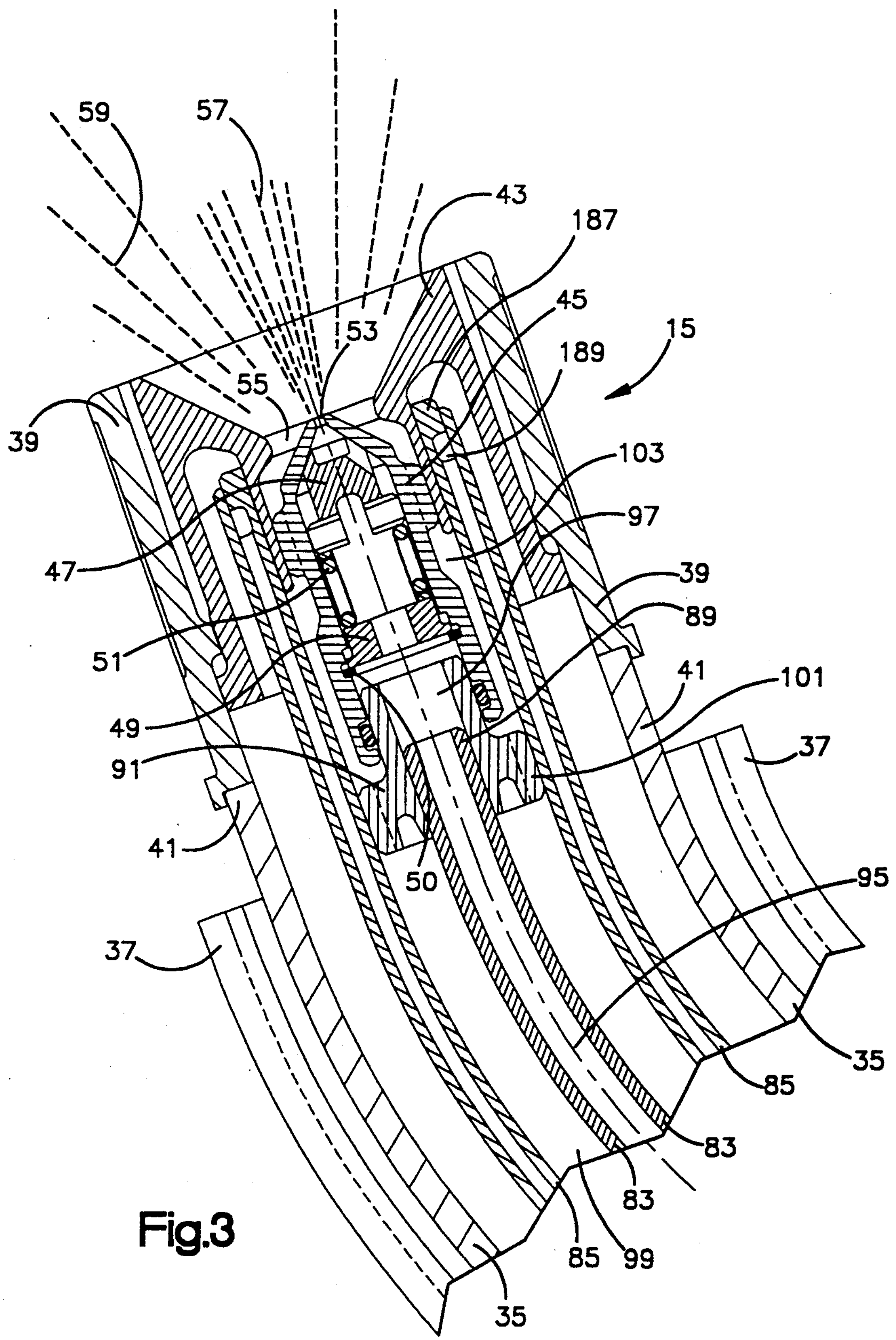
FIG. 3 is an enlarged cross sectional view of another tip portion of the nozzle shown in FIG. 1 taken along the same line as FIG. 1.

As shown in FIG. 3, the main tip 15 includes a tip shroud 39 which is connected to the distal end 41 of the housing extension 35. Connected to the interior of the tip shroud 39 is a secondary orifice piece 43. Connected within the secondary orifice piece 43 is a primary orifice piece 45. Finally, disposed within the primary orifice piece 45 is a swirler plug 47, a retainer 49, a retainer clip 50, and a spring 51 to urge the swirler plug 47 toward the primary orifice 53 in the primary orifice piece 45. A secondary orifice 55 is located in the secondary orifice piece 43. The construction of these pieces of main tip 15 is such that a narrow interior cone 57 of fuel is sprayed from primary orifice 53 and a wider exterior cone 59 of fuel is sprayed from the secondary orifice 55. These form the primary spray 57 and secondary spray 59 of the fuel from the main tip 15.

Figure 4:
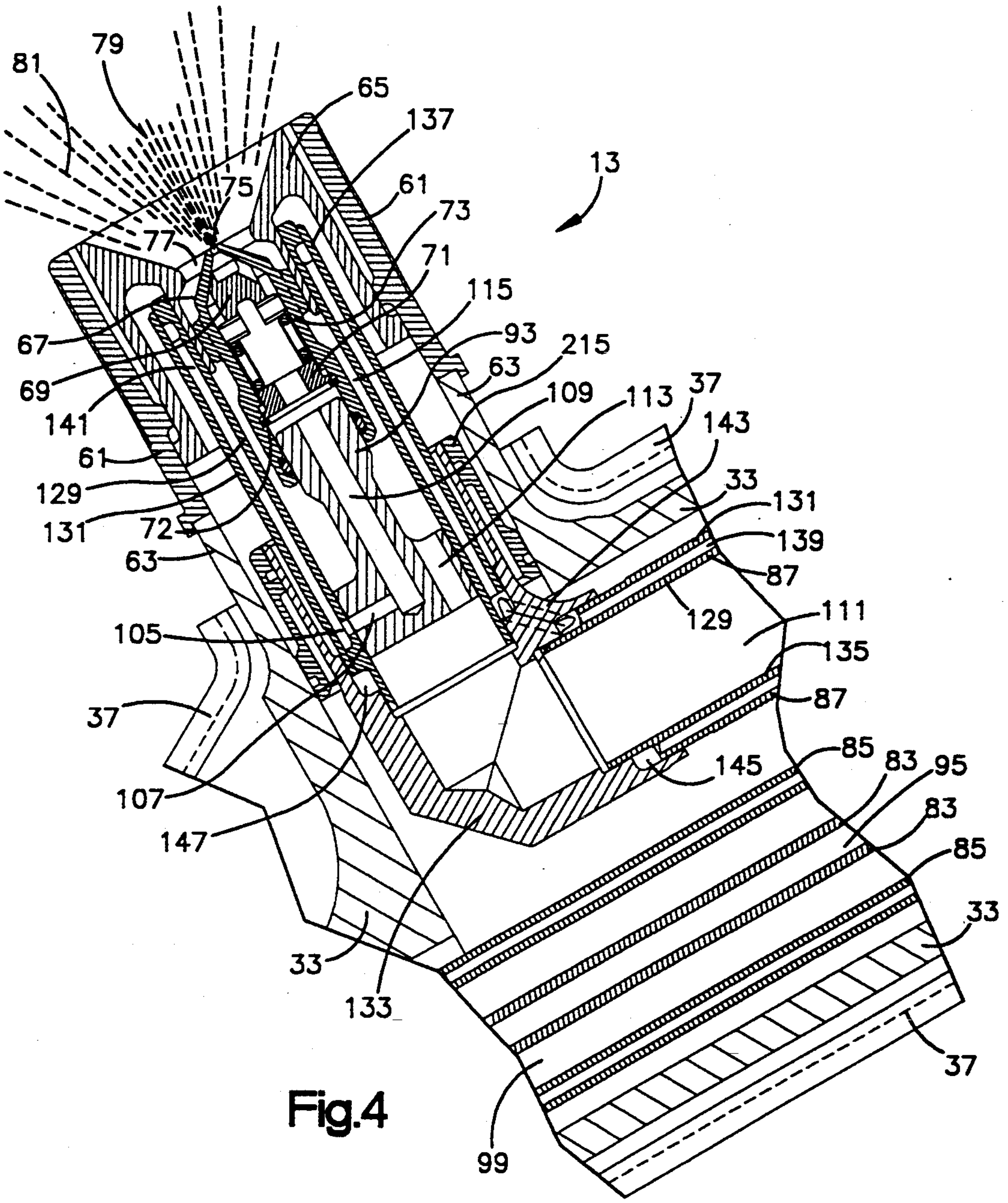
FIG. 4 is an enlarged cross sectional view of yet another tip portion of the nozzle shown in FIG. 1 taken along the same line as FIG. 1.
Figure 5:
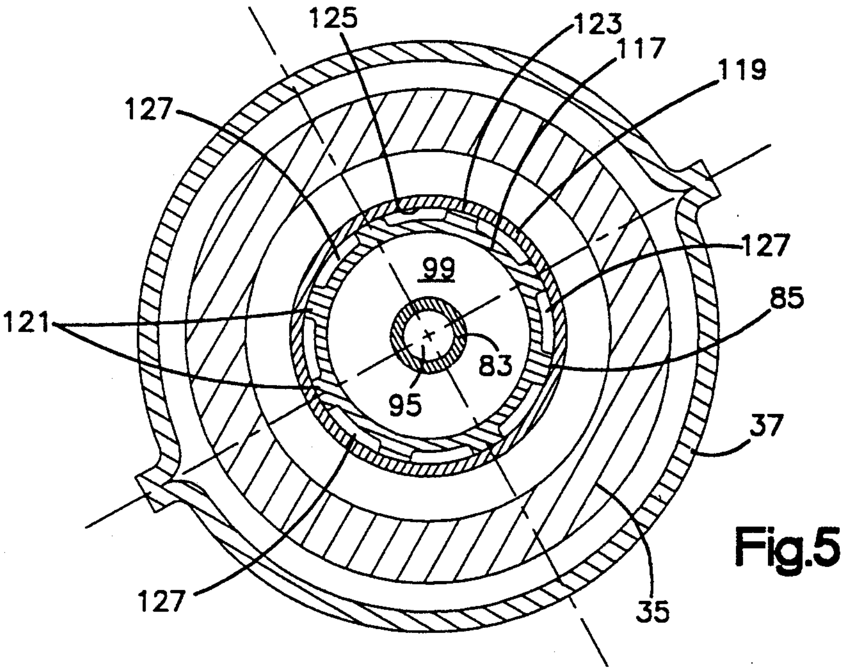
FIG. 5 is a transverse cross-sectional view of the nozzle of FIG. 1 taken along the lines shown in FIG. 1.
Figure 6:
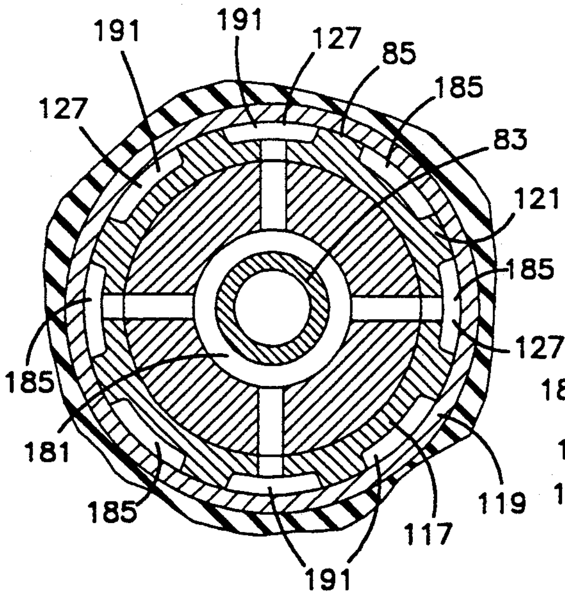
FIG. 6 is a transverse cross-sectional view of the nozzle of FIG. 2 taken along the lines shown in FIG. 2.
Figure 7:
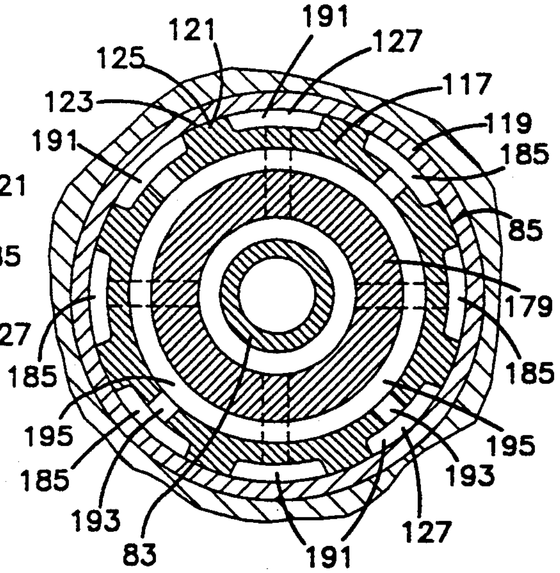
FIG. 7 is a transverse cross-sectional view of the nozzle of FIG. 2 taken along the lines shown in FIG. 2.
Figure 8:
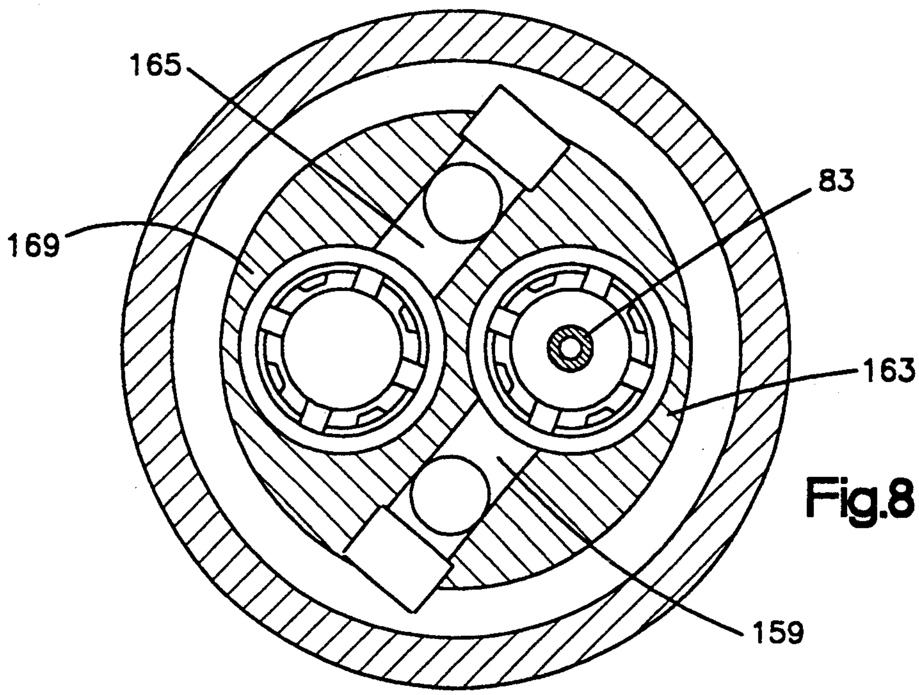
FIG. 8 is a transverse cross-sectional view of the nozzle of FIG. 2 taken along the lines shown in FIG. 2.

Referring now to FIG. 4, the pilot tip 13 has an identical construction to the main tip 15. The pilot tip 13 includes a tip shroud 61 which is connected to a pilot tip cylindrical projection portion 63 of housing mid-section 33. Connected to the interior of the tip shroud 61 is a secondary orifice piece 65. Connected within the secondary orifice piece 65 is a primary orifice piece 67. Finally, disposed within the primary orifice piece 67 is a swirler plug 69, a retainer 71, a retainer clip 72, and a spring 73 to urge the swirler plug 69 toward the primary orifice 75 in the primary orifice piece 67. A secondary orifice 77 is located in the secondary orifice piece 65. The construction of these pieces of pilot tip 13 is such that a narrow interior cone 79 of fuel is sprayed from primary orifice 75 and a wider exterior cone 81 of fuel is sprayed from the secondary orifice 77. These form the primary spray 79 and secondary spray 81 of the fuel from the pilot tip 13.

Pieces 39 through 51 of main tip 15 and pieces 61 through spring 73 of pilot tip 13 are commonly referred to as metering sets. The metering sets shown are conventional and well known to those who are skilled in the art of gas turbine spray nozzles, particularly those spray nozzles having primary and secondary sprays. Both have means to provide a swirling atomization of the sprayed fuel and this is well known. Therefore, the construction and arrangement of the portions of the metering sets are well known.

Referring to FIG. 1 through 8, the tubes and conduits which convey fuel to the pilot tip 13 and the main tip 15 include a main primary tube 83, a main cooling tube assembly 85, and a pilot cooling tube assembly 87. The main primary tube 83 is disposed axially within the main cooling tube assembly 85. The main cooling tube assembly 85 and the main primary tube 83 extend from the housing base 23 to the main tip 15 within housing mid-section 33 and housing extension 35. Pilot cooling tube assembly 87 extends from housing base 23 to the pilot tip 13 within housing mid-section 33.

Extending between the distal end 89 of main primary tube 83 and the main cooling tube assembly 85 is a main tip adapter 91. The main tip adapter provides sealing connections for flow to the main tip 15 from the main primary tube 83 and the main cooling tube assembly 85. Connected within pilot cooling tube assembly 87 is a pilot tip adapter 93. The pilot tip adapter is sealingly connected to the pilot tip 13 to convey the flow of fuel from the pilot cooling tube assembly 87 to the pilot tip 13.

Referring particularly to FIG. 3, flow to the primary spray 57 of main tip 15 is through a central conduit 95 in main primary tube 83. This fuel flows from central conduit 95 through a central opening 97 in main tip adapter 91 and then through the primary orifice piece 45 through metering set and swirled through the primary orifice 53. The fuel for the secondary spray 59 is conveyed to the main tip 15 through an annular conduit 99 formed between the exterior of main primary tube 83 and the interior of main cooling tube assembly 85. Flow from annular conduit 99 passes through an exterior slotted opening 101 in main tip adapter 91, through an annular space 103 between primary orifice piece 45 and the main cooling tube assembly 85, to the secondary orifice 55. This fuel then forms secondary spray 59.

Referring now to FIG. 4, the fuel flows to the pilot tip 13 are conveyed through pilot cooling tube assembly 87. Flow to the primary spray 79 of pilot tip 13 is through a radial opening 105 in the interior of cooling tube assembly 87 to (Flow to the tip through tube 87 to this point is described in more detail below.) a radially extending conduit 107 in pilot tip adapter 93. From the radially extending conduit 107 fuel flows to the axial conduit 109 in pilot tip adapter 93 and into the interior of the primary orifice piece 67. This fuel then exits the primary orifice piece 67 through primary orifice 75 to form the primary spray 79. The fuel flow to the secondary spray 81 is provided through a central conduit 111 in pilot cooling tube assembly 87. Fuel flow from central conduit 111 flows through an off-axis longitudinal opening 113 in pilot tip adapter 93 into an annular space 115 between pilot cooling tube assembly 87 and the primary orifice piece 67. This fuel then flows through secondary orifice 77 to form the secondary spray 81 of pilot tip 13.

Critically important to the present invention is the concept and method of cooling the cooling tubes assemblies 85 and 87 and the construction of these tubes. Main cooling tube assembly 85 comprises a finned inner tube 117 sealingly mated within an outer tube 119. The finned inner tube 117 has radially outwardly extending fins 121 evenly (could be uneven in some applications) spaced about the exterior of the finned inner tube 117. Each of the radially outwardly extending fins 121 has a cylindrical section outer surface 123 which mates with the cylindrical interior surface 125 of the outer tube 119. This forms longitudinally extending interstitial spaces 127 between finned inner tube 117 and outer tube 119. The radially outwardly extending fins 121 thus provide for longitudinally extending interstitial spaces 127 through which fuel can flow and also provide for heat transfer between the finned inner tube 117 and the outer tube 119.

Pilot cooling tube assembly 87 is also constructed with a finned inner tube 129 and an outer tube 131. The dimensions and spacing of the fins in pilot cooling tube assembly 87 are identical to those in main cooling tube assembly 85. To allow ease of construction and to provide for a right angle bend in the pilot cooling tube assembly 87, a pilot elbow piece 133 is provided in pilot cooling tube assembly 87 beneath pilot tip 13. Thus, pilot cooling tube assembly 87 includes a first long section 135, pilot elbow piece 133, and a second short section 137. Interstitial spaces 139 in the first long section 135 of pilot cooling tube assembly 87 are connected to interstitial spaces 141 in second short section 137 through an elbow conduit holes 143 which extends in pilot elbow piece 133 between annular openings 145 and 147 in pilot elbow piece 133. The annular opening 145 connected to the interstitial spaces 139 and the annular opening 147 connects to every other of the interstitial spaces 141.

Figure 2:
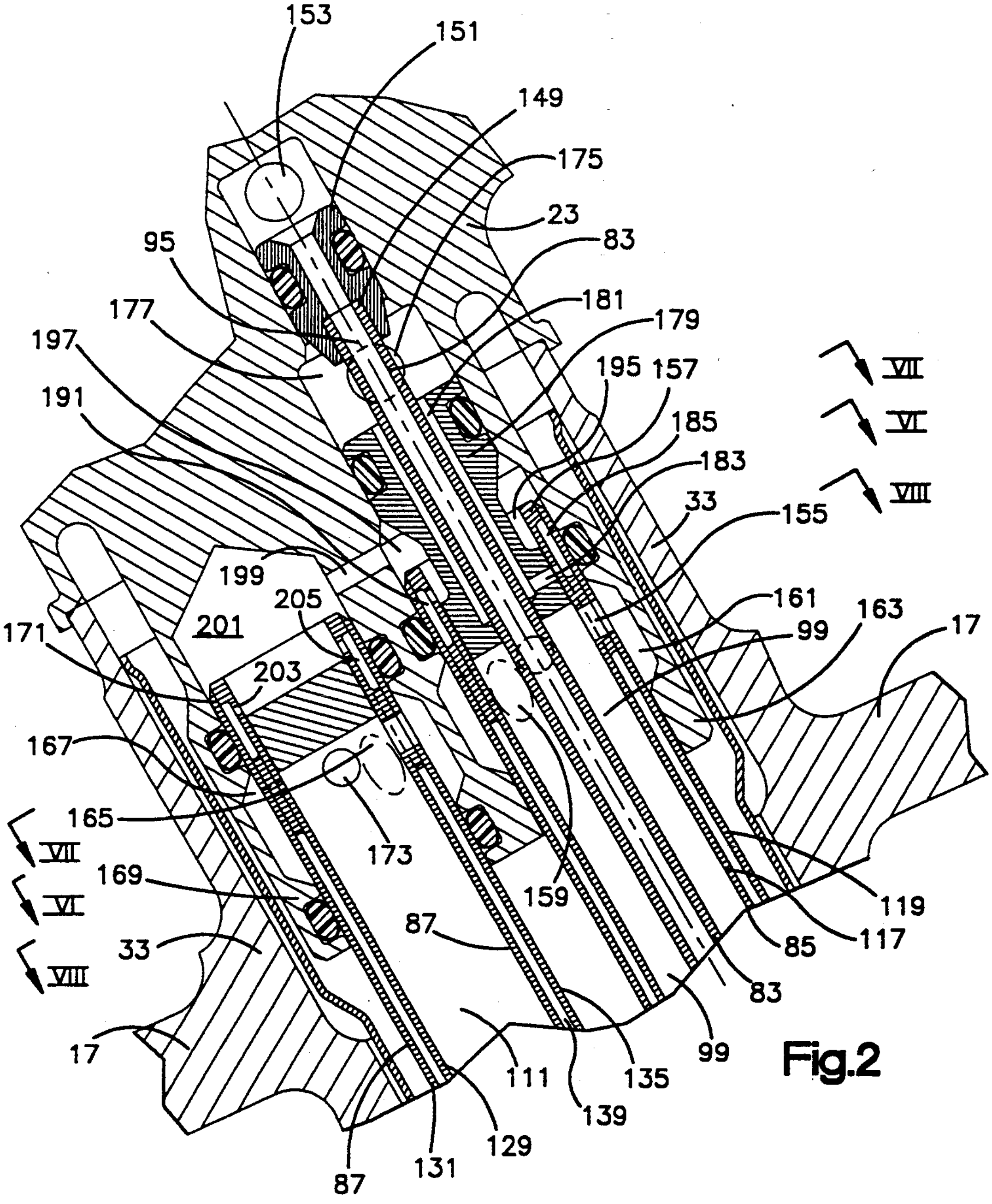
FIG. 2 is an enlarged cross-sectional view of a portion of the nozzle shown in FIG. 1 taken along the same line as FIG. 1.

As shown in FIG. 2, the main primary tube 83 is connected at its proximate end 149 to a main tube seal adapter 151 which connects to housing 23. An internal conduit 153 in housing base 23 extends from connection 29 to main tube seal adapter 151 so that fluid flows from connection 29 through internal conduit 153 to central conduit 95 in main primary tube 83.

Fuel flow to the annular conduit 99 between the exterior of main primary tube 83 and the interior of main cooling tube assembly 85 is provided through a radial opening 155 in the proximate end 157 of main cooling tube assembly 85. Fuel from connection 31 is conveyed through an internal conduit 159 in housing base 23 to an annular space 161 in an end portion 163 of housing base 23. The cylindrical projection portion 63 sealingly receives the proximate end of 157 of main cooling tube assembly 85 so that the radial opening 155 sealingly connects to the annular end space 161 formed between the end portion 163 and the main cooling tube assembly 85. Thus, fuel flows from the internal conduit 159 through the annular end space 161 to the radial opening 155 and into annular conduit 99 in the main cooling tube assembly 85. This sealingly connects the connection 31 for fluid flow to the annular opening 99 in main cooling tube assembly 85.

Flow to the central conduit 111 of pilot cooling tube assembly 87 is provided through an internal conduit 165 in housing base 23. Internal conduit 165 extends from connection 27 to an annular space 167 in an end portion 169 of housing 23. The end portion 169 sealingly receives the proximate end 171 of pilot cooling tube assembly 87. A radial opening 173 is provided in pilot cooling tube assembly 87 to connect the annular space 167 to the central conduit 111 of the pilot cooling tube assembly 87. Thus, fuel flows from connection 27 through internal conduit 165 to the annular space 167 and through radial opening 173 to central conduit 111 of pilot cooling tube assembly 87.

Flow to the interstitial spaces of cooling tubes assemblies 85 and 87 is provided through an internal conduit 175 in housing base 23. Internal conduit 175 connects connection 25 to an annular space 177 formed between the exterior of the proximate end 149 of main primary tube 83 and the end portion 163. A connector seal adapter 179 sealingly joins housing base 23, main primary tube 83, and main cooling tube assembly 85. An annular opening 181 between connector seal adapter 179 and the exterior of main primary tube 83 connects the annular space 177 to a radial opening 183 which extends in connector seal adapter 179 within main cooling tube assembly 85. The radial opening 183 connects to a set of annular interstitial spaces 185 provided in the proximate end 157 of main cooling tube assembly 85. The annular interstitial spaces 185 comprise alternating parallel pairs of the longitudinally extending interstitial spaces 127. Thus, fuel flow from cylindrical interior surface 125 flows through internal conduit 175 to annular space 177 to annular opening 181 to radial opening 183 to annular interstitial spaces 185. Fuel flows the length of the cooling tube assembly 85 through the alternating parallel pairs of interstitial spaces 185. This fuel then flows to the distal end 187 of main cooling tube assembly 85. An annular space 189 in the distal end 187 of main cooling tube assembly 85 connects all of the longitudinally extending interstitial spaces 127 of main cooling tube assembly 85. Thus, fuel from the pairs of interstitial spaces 185 flowing toward the distal end 187 is connected 16 the other pairs longitudinally extending interstitial spaces 127 to flow back to the proximate end 157 of main cooling tube 185. The other pairs of longitudinally extending interstitial spaces 127 with the return flow of fuel comprise annular interstitial spaces 191 in the proximate end 157 of main cooling tube assembly 85. Each of the annular interstitial spaces 191 is connected to a radial opening 193 in finned inner tube 117. The radial openings 193 are, in turn, connected to an annular space 195 between seal adapter 179 and finned tube 117. The annular space 195 connects to an annular opening 197 which extends between connector seal adapter 179 and end portion 163. A connector conduit 199 extends between the annular opening 197 and an end space 201 at the proximate end of end portion 169. Thus, return flow from the main cooling tube assembly 85 is conveyed through the annular interstitial spaces 191 to the annular opening 195 to the annular opening 197 and through the connector conduit 199 to the end space 201. A radially extending opening 203 is provided in the finned inner tube 129 of pilot cooling tube assembly 87 to connect the end space 201 to an annular space 205 between finned inner tube 129 and outer tube 131. The annular space 205 is connected to each of the interstitial spaces 139 in pilot cooling tube assembly 87. In this manner, fluid from the end space 201 can pass through the radial extending opening 203 and into the interstitial spaces in pilot cooling tube assembly 87.

Figure 9:
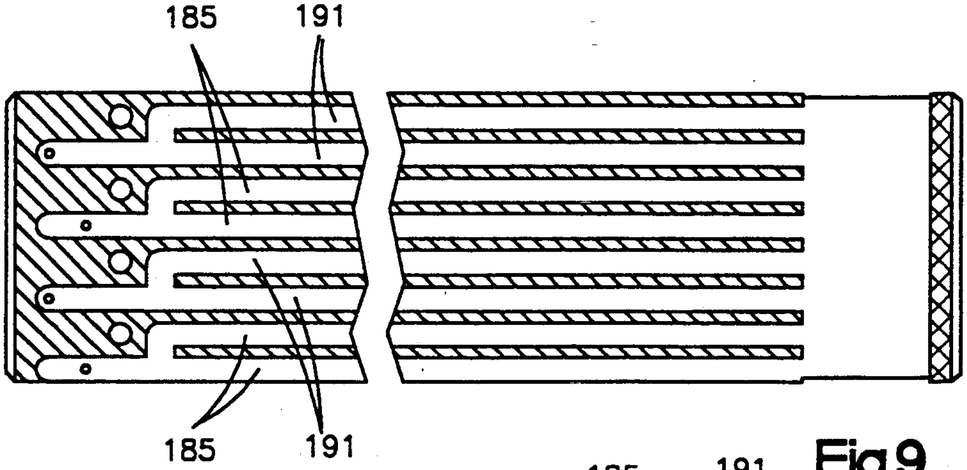
FIG. 9 is a schematic unrolled sectional view of the surface section of a tube of the device shown in FIG. 1.

FIG. 9 schematically shows the connection of the interstitial spaces 185 and 191 and schematically depicts the inner tube 117 of main cooling tube assembly 85 as if it were cut longitudinally, laid flat, and then shaded to show the interstitial spaces. FIG. 9 shows adjacent longitudinal interstitial spaces being connected so as to have parallel flow. Thus two adjacent spaces 185 have flows toward the nozzle tips and the next two adjacent spaces 191 have flows away from the nozzle tips. However, arrangement of the flow paths can be varied by the way in which the longitudinal interstitial spaces are connected.

Figure 10:
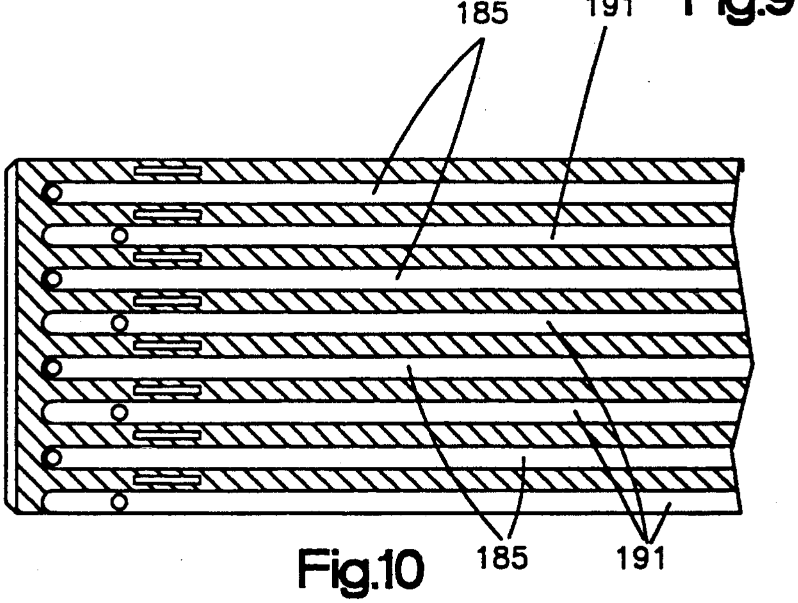
FIG. 10 is a schematic unrolled sectional view of the surface section of an alternate tube of the device shown in FIG. 1.

FIG. 10 is a figure of the same schematic form as FIG. 9 and shows an alternate arrangement of fuel flow paths for tube 117 in which every other interstitial spaces 185 and 191 flows fuel in an opposite direction.

The illustrated nozzle 11 has a length of approximately 10 inches. The cooling tubes 85 and 87 have an internal diameter of approximately 0.25 inches and an outer diameter of approximately 0.36 inches. The interstitial spaces 185 and 191 have a width of from about 0.045 inches to about 0.080 inches. The interstitial spaces 185 and 191 have a height of from about 0.015 inches to about 0.04 inches with the most preferable height being approximately 0.02 inches. These dimensions allow a maximum of heat transfer while preventing clogging due to contaminants in the fuel.

Figure 11:
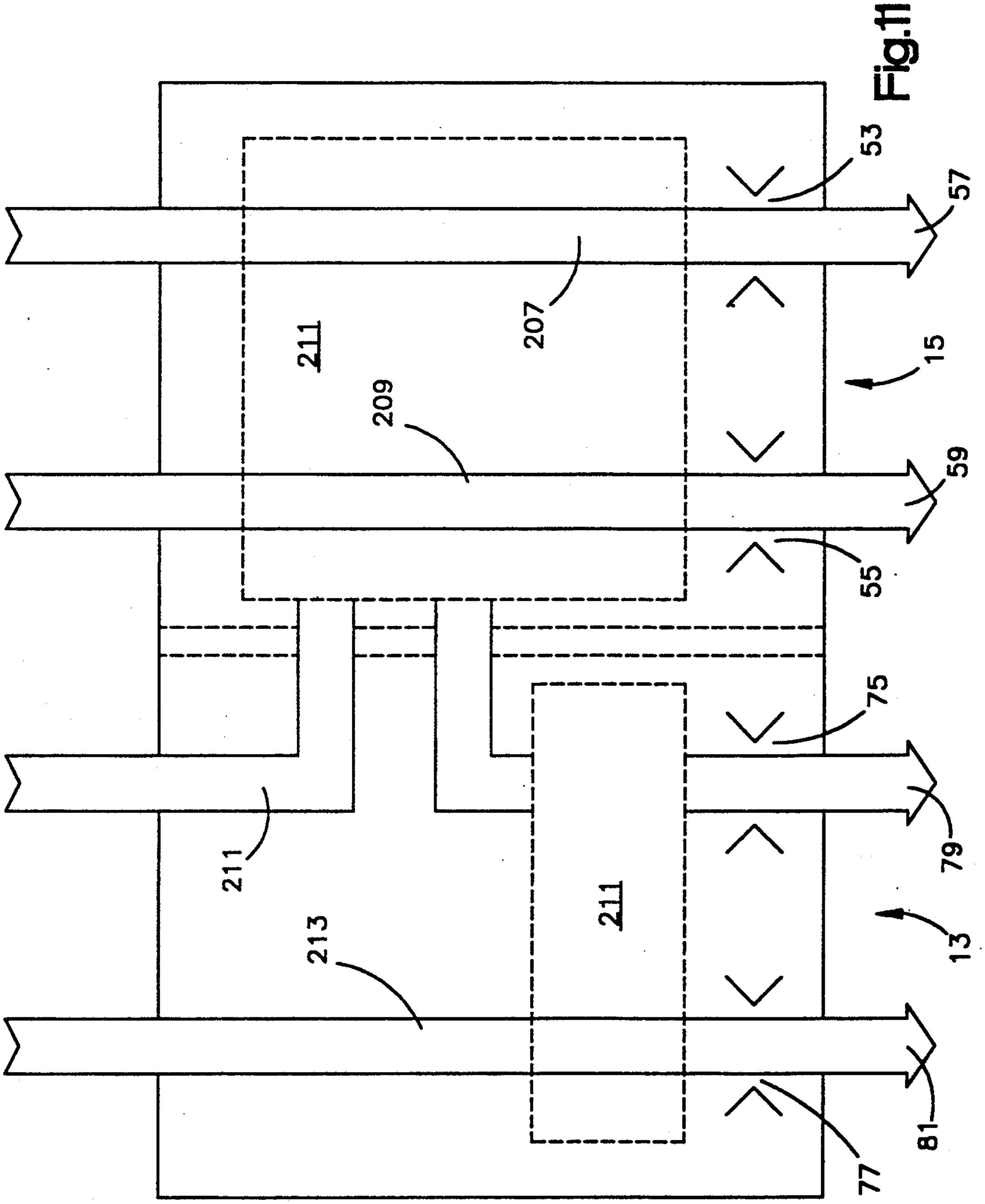
FIG. 11 is a schematic view of the flow and process of the nozzle of the present invention.

Fuel flow is shown conceptually in FIG. 11. The fuel flow for the primary spray of main tip 15 is depicted by arrow 207. The fluid flow for the secondary spray of main tip 15 is depicted by arrow 209. The fuel flow for the primary spray of pilot tip 13 is depicted by arrow 211 and the fuel flow for the secondary spray of pilot tip 13 is depicted by arrow 213. This shows that the fuel flow 211 for the primary spray of the pilot tip 13 provides cooling for the passages for fuel flows 207, 209, and 213. Since the primary spray fuel flow 211 is always utilized even in the lowest power conditions, this provides protection against coking in the fuel conduits conveying the fuel to the primary and secondary sprays of the main tip 15. Since the primary and secondary sprays 207 and 209 can be in low or no flow conditions when various power conditions of the engine are needed, this protects against coking in the-low or no flow conditions of these conduits. This is especially important at the metering set portion of main tip 15. Thus, the distal end 187 of main cooling tube assembly 85 extends within secondary orifice piece 43 to surround and cool the fuel passages when little or no fuel is exiting primary orifice 53 and secondary orifice 55.

In high power conditions when high fuel flow is conveyed through streams 209 and 213 fuel flow in streams 209 and 213 can cool the lower more exposed fuel flow in stream 211. Thus, heat transfer can work both ways so that cooling occurs to the fuel to prevent coking under both high power and low power conditions required by the engine.

Construction of the nozzle of the present invention can be achieved in convenient steps. First, the long cooling tube 135 and short cooling tube 137 of the pilot cooling tube are constructed by brazing the inner tube of each segment to the outer tube of each segment. These tubes are formed of stainless steel and a brazing compound is applied to the contacting surfaces of the fins of the inner tubes. The inner tube is then fitted within the outer tube and expanded to provide close contact between the two. The inner and outer tubes then are heated to braze the two together. The pilot elbow piece 133 is then brazed to the first long section 135 and this piece is inserted in the housing mid-section 33. Pilot tip adapter 93 is then brazed within the short segment 137 and the short segment is brazed to the pilot elbow piece 133. A brazed mounting piece 215 is used to fix the pilot cooling tube assembly 87 within housing mid-section 33.

The main cooling tube is formed by brazing its inner tube to its outer tube in the same manner as the pilot cooling tube is formed. The main cooling tube is initially formed as a single straight pieces. While still straight, spacers 40 are brazed to the main primary tube 83 and the adapter 91 is also brazed to the main primary tube 83. Then the main primary tube 83 is inserted in the housing and brazed to main cooling tube assembly 85. The combined tubes are then bent so that the distal end is properly directed. Then adapters 179 and 151 are connected to the ends of main primary tube 83 and main cooling tube assembly 85. Housing extension 35 is then placed over the bend portion of the main cooling tube and the main cooling tube is inserted in the housing mid-section 33. The housing extension 35 is then welded to the housing mid-section 33. The heat shield 37, formed of two longitudinal pieces, is then welded together about the housing mid-section 33 and the housing extension 35.

Each of the metering sets is built and prequalified for hydraulic performance separately. The metering sets are then welded to the housing at distal end 41 and cylindrical opening portion 63, respectively.

The housing base 23 is formed from bar stock and the conduits and connections 25 through 31 are added by conventional manufacturing techniques. The end portions 163 and 169 are machined in the housing base 23 to provide close tolerance fits to the parts inserted therein. Viton o-ring seals are inserted at locations necessary for sealing where shown and the housing mid-section 33 is then carefully joined to the housing base 23. After joining the housing base 23 is welded to the housing mid-section 33.

Thus, the present invention is well adapted to achieve the objects and advantages mentioned as well as those inherent therein. It will be appreciated that this specification and claims are set forth by way of illustration and not of limitation, and that various changes and modifications may be made without departing from the spirit and scope of the present invention.

What is claimed is:

1. A method of dispensing fuel in a gas turbine engine of the type having pilot nozzle tips from which fuel is sprayed in primary and secondary sprays into a pilot zone of the combustor and main nozzle tips from which fuel is sprayed in primary and secondary sprays into a main zone of the combustor, comprising:

conveying fuel to the primary spray of the main nozzle tip in a main primary fuel stream;

conveying fuel to the secondary spray of the main nozzle tip in a main secondary fuel stream;

conveying fuel to the primary spray of the pilot nozzle tip in a pilot primary fuel stream;

conveying fuel to the secondary spray of the pilot nozzle tip in a pilot secondary fuel stream;

transferring heat between fuel in said pilot primary fuel stream and fuel in said main secondary fuel stream; and transferring heat between fuel in said pilot secondary fuel stream and fuel in said pilot primary fuel stream.

2. The method of claim 1 wherein said step of conveying fuel to the primary spray of the pilot nozzle tip comprises first conveying said fuel in said pilot primary fuel stream to and from the main nozzle tip along and in a heat transfer relationship with said main secondary fuel stream.

3. The method of claim 2 wherein said step of conveying fuel to the primary spray of the pilot nozzle tip comprises second conveying, after said first conveying, said fuel in said pilot primary fuel stream to said pilot nozzle tip along and in a heat transfer relationship with said pilot secondary fuel stream.

4. The method of claim 3 wherein said first conveying comprises conveying said pilot primary fuel stream radially outside said main secondary fuel stream.

5. The method of claim 4 wherein said second conveying comprises conveying said pilot primary fuel stream radially outside said pilot secondary fuel stream.

6. A gas turbine fuel nozzle cooling circuit for a gas turbine engine, comprising:

a first fuel spray nozzle disposed to spray fuel for combustion in the gas turbine engine;

a second fuel spray nozzle disposed to spray fuel for combustion in the gas turbine engine;

a first fuel conduit which extends within said first fuel spray nozzle to convey fuel to be sprayed therefrom; and a second fuel conduit separate from said first fuel conduit, a second portion of which extends in said second fuel spray nozzle to convey fuel to be sprayed therefrom and a first portion of which extends adjacent to and is intimately connected in a heat transfer relationship with said first fuel conduit, wherein said first fuel conduit is formed by a first tube through the interior of which fuel can flow to be sprayed from said first nozzle;

and wherein said first portion of second fuel conduit is formed by a second tube extending about said first tube with longitudinal webs extending radially therebetween which mate with said first and second tubes to form interstitial spaces between said webs through which fuel can flow for heat transfer with fuel in said interior of said first tube.

7. A gas turbine fuel nozzle cooling circuit for a gas turbine engine, comprising:

a first fuel conduit disposed in said engine and connected to convey fuel to be sprayed for combustion in said engine;

a second fuel conduit disposed in said engine and connected to convey fuel to be sprayed for combustion in said engine;

a third fuel conduit disposed in said engine and connected to convey fuel to be sprayed for combustion in said engine;

a fourth fuel conduit disposed in said engine and connected to convey fuel to be sprayed for combustion in said engine;

said third fuel conduit extends along and is intimately connected in a heat transfer relationship with said second fuel conduit and said fourth fuel conduit; and said third fuel conduit comprising a second conduit tube section and a fourth conduit tube section, said second conduit tube section comprising a webbed main inner tube with a plurality of longitudinal webs extending radially outwardly therefrom, and a main outer tube which mates with the said webs of said main inner tube to form interstitial spaces between said webs through which fuel can flow along said second fuel conduit for heat transfer.

8. The gas turbine nozzle cooling circuit of claim 7 wherein said fourth conduit tube section of said third fuel conduit comprises a webbed pilot inner tube with a plurality of longitudinal webs extending radially outwardly therefrom and a pilot outer tube which mates with said webs of said pilot tube to form interstitial spaces between said webs through which fuel can flow along said fourth fuel conduit for heat transfer.

9. The gas turbine fuel nozzle cooling circuit of claim 8 wherein said first conduit comprises a main fuel tube disposed in said main inner tube and through which fuel can be conveyed and wherein said second fuel conduit comprises said main inner tube and said main fuel tube having a main secondary annulus therebetween through which fuel can be conveyed.

10. A gas turbine fuel nozzle cooling circuit for a gas turbine engine, comprising:

a first fuel conduit disposed in said engine and connected to convey fuel to be sprayed for combustion in said engine;

a second fuel conduit disposed in said engine and connected to convey fuel to be sprayed for combustion in said engine;

a third fuel conduit in said engine and connected to convey fuel to be sprayed for combustion in said engine;

a fourth fuel conduit in said engine and connected to convey fuel to be sprayed for combustion in said engine;

a first nozzle spray tip to dispense fuel from said first and second fuel conduits, and a second nozzle spray tip to dispense fuel from said third and fourth fuel conduits; and said third fuel conduit extends along in adjoining relation and is intimately connected in a heat transfer relationship with said second fuel conduit, said fourth fuel conduit and said first nozzle spray tip.

11. The gas turbine fuel nozzle cooling circuit as in claim 10, wherein said third fuel conduit is also in heat transfer relationship with said second nozzle spray tip.

12. The gas turbine fuel nozzle cooling circuit as in claim 10, wherein said third fuel conduit at least partially surrounds one of said second and fourth fuel conduits.

13. A gas turbine fuel nozzle cooling circuit for a gas turbine engine, comprising:

a first fuel spray nozzle disposed to spray fuel for combustion in the gas turbine engine;

a second fuel spray nozzle disposed to spray fuel for combustion in the gas turbine engine;

a first fuel conduit which extends within said first fuel spray nozzle to convey fuel to be sprayed therefrom; and a second fuel conduit separate from said first fuel conduit, a second portion of which extends in said second fuel spray nozzle to convey fuel to be sprayed therefrom, and a first portion of which extends adjacent to, surrounds at least a portion of, and is intimately connected in a heat transfer relationship with said first fuel spray nozzle and said first fuel conduit, and said second fuel conduit has a portion which directs fuel toward said first fuel spray nozzle, and a separate portion which directs fuel away from said first fuel spray nozzle.

14. The gas turbine fuel nozzle cooling circuit of claim 13, wherein said first fuel conduit is disposed within said second fluid conduit, and webbing extends longitudinally between said first fuel conduit and said second fluid conduit to form longitudinally-extending interstices for carrying fuel toward and away from said first fuel spray nozzle.

15. The gas turbine fuel nozzle cooling circuit of claim 14, wherein certain of said interstices are designed to carry fluid along the length of said first fluid conduit toward said first fuel spray nozzle, and others of said interstices are designed to carry fluid along the length of said first fluid conduit away from said first fuel spray nozzle.

16. The gas turbine fuel nozzle cooling circuit of claim 15, wherein said interstices are fluidly interconnected at said first fuel spray nozzle.

17. A gas turbine fuel nozzle cooling circuit for a gas turbine engine, comprising:

a first fuel spray nozzle disposed to spray fuel for combustion in the gas turbine engine;

a second fuel spray nozzle disposed to spray fuel for combustion in the gas turbine engine;

a first fuel conduit which extends within said first fuel spray nozzle to convey fuel to be sprayed therefrom; and a second fuel conduit separate from said first fuel conduit, a second portion of which extends in said second fuel spray nozzle to convey fuel to be sprayed therefrom and a first portion of which extends adjacent to and is intimately connected in a heat transfer relationship with said first fuel conduit and said first fuel spray nozzle, said first portion of said second fuel conduit forming a first fluid path to direct fuel toward said first fuel spray nozzle and a second fluid path to direct fuel away from said first fuel spray nozzle.

18. The gas turbine fuel nozzle cooling circuit as in claim 17, wherein said first fuel spray nozzle comprises a main nozzle spray tip, and said second fuel spray nozzle comprises a pilot nozzle spray tip separate from said main nozzle spray tip.

19. The gas turbine fuel nozzle cooling circuit as in claim 17, wherein said first portion of said second fuel conduit surrounds at least a portion of said first fuel conduit and said second fuel spray nozzle is disposed within and surrounded by said first fuel spray nozzle.

20. The gas turbine fuel nozzle cooling circuit of claim 17, wherein said first portion of said second fuel conduit extends along and is intimately connected in a heat transfer relationship with said first fuel spray nozzle.

21. The gas turbine fuel nozzle cooling circuit of claim 20, wherein said first portion of said second fuel conduit surrounds at least a portion of said first fuel conduit and said first fuel spray nozzle, and said second fuel conduit has a portion which directs fuel toward said first fuel spray nozzle, and a separate portion which directs fuel away from said first fuel spray nozzle.

22. A gas turbine fuel nozzle, comprising:

a nozzle housing;

a main nozzle spray tip connected to said housing and having a main primary spray orifice through which fuel can be dispersed for combustion and a main secondary spray orifice through which fuel can be dispersed for combustion;

a pilot nozzle spray tip connected to said housing and having a pilot primary spray orifice through which fuel can be dispersed for combustion and a pilot secondary spray orifice through which fuel can be dispersed for combustion;

a main primary fuel conduit disposed in said housing and connected to convey fuel to said main primary spray orifice;

a main secondary fuel conduit disposed in said housing and connected to convey fuel to said main secondary spray orifice;

a pilot primary fuel conduit disposed in said housing and connected to convey fuel to said pilot primary spray orifice;

a pilot secondary fuel conduit disposed in said housing and connected to convey fuel to said pilot secondary spray orifice; and said pilot primary fuel conduit extends along and is intimately connected in a heat transfer relationship with said main secondary fuel conduit and said pilot secondary fuel conduit.

23. The gas turbine fuel nozzle cooling circuit of claim 22, wherein a first portion of said pilot primary fuel conduit at lease particularly surrounds and is intimately connected in heat transfer relationship with said main nozzle spray tip, and a second portion of said pilot primary fuel conduit at least particularly surrounds and is intimately connected in heat transfer relationship with said pilot nozzle spray tip.

24. The gas turbine fuel nozzle cooling circuit of claim 22, wherein said first portion of said pilot primary fuel conduit at least particularly surrounds said main secondary fuel conduit and said second portion of said pilot secondary fuel conduit at least particularly surrounds said pilot secondary fuel conduit.

25. The gas turbine fuel nozzle cooling circuit of claim 24, wherein said first portion of said pilot primary fuel conduit is coaxial with said main secondary fuel conduit and said second portion of said pilot primary fuel conduit is coaxial with said pilot secondary fuel conduit.

26. The gas turbine fuel nozzle cooling circuit of claim 25, wherein webbing extends longitudinally between said main secondary fuel conduit and said first portion of said pilot primary fuel conduit, said webbing defining interstices for carrying fuel, a first plurality of said interstices carrying fuel toward said main nozzle spray tip, and a second plurality of said interstices carrying fuel away from said main nozzle spray tip, said first and second plurality of interstices being fluidly interconnected at said main nozzle spray tip.

27. The gas turbine fuel nozzle cooling circuit of claim 25, wherein webbing also extends between said pilot secondary fuel conduit and said pilot primary fuel conduit, said webbing defining interstices for carrying fuel, said interstices carrying fuel toward said pilot nozzle spray tip.

28. The gas turbine fuel nozzle of claim 22 wherein said main primary fuel conduit is disposed within said main secondary fuel conduit.

29. The gas turbine fuel nozzle of claim 28 wherein said main secondary fuel conduit is disposed within a portion of said pilot primary fuel conduit.

30. The gas turbine fuel nozzle of claim 29 wherein said pilot secondary fuel conduit is disposed within a portion of said pilot primary fuel conduit.

31. The gas turbine fuel nozzle of claim 30 wherein said pilot primary fuel conduit comprises a main tube section and a pilot tube section and wherein said main tube section comprises a webbed main inner tube with a plurality of longitudinal webs extending radially outwardly therefrom, and a main outer tube which mates with said webs of said main inner tube to form interstitial spaces between said webs through which fuel can flow to and from said main nozzle spray tip.

32. The gas turbine fuel nozzle of claim 31 wherein said pilot tube section of said pilot primary fuel conduit comprises a webbed pilot inner tube with a plurality of longitudinal webs extending radially outwardly therefrom, and a pilot outer tube which mates with said webs of said pilot inner tube to form interstitial spaces between said webs through which fuel can flow to said pilot nozzle spray tip.

33. The gas turbine fuel nozzle of claim 32 wherein said main primary fuel conduit comprises a main primary fuel tube disposed in said main inner tube and through which fuel can be conveyed to said main primary spray orifice and wherein said main secondary conduit comprises said main inner tube and said main primary fuel tube having a main secondary annulus therebetween through which fuel can be conveyed to said main secondary spray orifice.

34. The gas turbine fuel nozzle of claim 33 wherein said pilot secondary fuel conduit comprises said pilot inner tube having a pilot secondary opening therein through which fuel can be conveyed to said pilot secondary spray orifice.

35. The gas turbine fuel nozzle of claim 34 wherein said main inner tube is brazed to said main outer tube.

36. The gas turbine fuel nozzle of claim 35 wherein said pilot inner tube is brazed to said pilot outer tube.

* * * * *